United States Patent
Liu et al.

(10) Patent No.: US 8,300,348 B1
(45) Date of Patent: Oct. 30, 2012

(54) DISK DRIVE DETECTING DISK BOUNDARIES USING MICROACTUATOR

(75) Inventors: Yanning Liu, San Ramon, CA (US); Norman D. Gardner, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 140 days.

(21) Appl. No.: 12/823,359

(22) Filed: Jun. 25, 2010

(51) Int. Cl.
*G11B 21/02* (2006.01)
*G11B 5/596* (2006.01)

(52) U.S. Cl. ....................... 360/75; 360/78.04
(58) Field of Classification Search ............ None
See application file for complete search history.

(56) References Cited

U.S. PATENT DOCUMENTS

| | | | |
|---|---|---|---|
| 4,532,802 A | 8/1985 | Yeack-Scranton et al. |
| 5,075,805 A | 12/1991 | Peddle et al. |
| 5,384,675 A | 1/1995 | Crawforth et al. |
| 5,559,648 A | 9/1996 | Hunter et al. |
| 5,576,906 A | 11/1996 | Fisher et al. |
| 5,668,679 A | 9/1997 | Swearingen et al. |
| 5,754,353 A | 5/1998 | Behrens et al. |
| 5,761,212 A | 6/1998 | Foland, Jr. et al. |
| 5,831,888 A | 11/1998 | Glover |
| 5,973,870 A | 10/1999 | Boutaghou et al. |
| 6,000,282 A | 12/1999 | Ku et al. |
| 6,021,012 A | 2/2000 | Bang |
| 6,023,386 A | 2/2000 | Reed et al. |
| 6,091,564 A | 7/2000 | Codilian et al. |
| 6,092,412 A | 7/2000 | Flechsig et al. |
| 6,249,896 B1 | 6/2001 | Ho et al. |
| 6,292,318 B1 | 9/2001 | Hayashi |
| 6,304,407 B1 | 10/2001 | Baker et al. |
| 6,411,453 B1 | 6/2002 | Chainer et al. |
| 6,429,989 B1 | 8/2002 | Schultz et al. |
| 6,507,450 B1 | 1/2003 | Elliott |
| 6,519,107 B1 | 2/2003 | Ehrlich et al. |
| 6,563,660 B1 | 5/2003 | Hirano et al. |
| 6,587,293 B1 | 7/2003 | Ding et al. |
| 6,590,732 B2 | 7/2003 | Kitagawa et al. |
| 6,603,622 B1 | 8/2003 | Christiansen et al. |
| 6,643,088 B1 | 11/2003 | Kawachi |
| 6,704,156 B1 | 3/2004 | Baker et al. |
| 6,721,121 B1 | 4/2004 | Schreck et al. |
| 6,738,205 B1 | 5/2004 | Moran et al. |
| 6,920,007 B2 | 7/2005 | Tominaga et al. |
| 7,019,932 B2 | 3/2006 | Hirano et al. |
| 7,046,475 B2 | 5/2006 | Hosokawa |
| 7,072,136 B2 | 7/2006 | Pit et al. |
| 7,088,533 B1 | 8/2006 | Shepherd et al. |
| 7,177,111 B2 | 2/2007 | Gururangan et al. |
| 7,190,547 B2 | 3/2007 | Khurshudov et al. |

(Continued)

OTHER PUBLICATIONS

U.S. Appl. No. 11/760,601, filed Jun. 8, 2007, 24 pages.

(Continued)

*Primary Examiner* — Regina N Holder

(57) ABSTRACT

A disk drive is disclosed comprising a disk, an actuator arm, a head coupled to a distal end of the actuator arm, a voice coil motor (VCM) operable to actuate the head over the disk in coarse movements by rotating the actuator arm about a pivot, and a microactuator operable to actuate the head over the disk in fine movements. A disk boundary condition is detected by moving the actuator arm toward one of an outer diameter of the disk and an inner diameter of the disk, and monitoring an induced voltage generated by the microactuator. The disk boundary condition is detected when the induced voltage exceeds a threshold.

24 Claims, 8 Drawing Sheets

U.S. PATENT DOCUMENTS

| | | |
|---|---|---|
| 7,209,310 B1 | 4/2007 | Tsai et al. |
| 7,391,586 B2 * | 6/2008 | Keast .............................. 360/75 |
| 7,453,661 B1 * | 11/2008 | Jang et al. ....................... 360/75 |
| 7,486,466 B2 | 2/2009 | Hara et al. |
| 7,502,194 B2 | 3/2009 | Alexander et al. |
| 7,869,155 B1 | 1/2011 | Wong |
| 2002/0027736 A1 | 3/2002 | Liu et al. |
| 2002/0071219 A1 | 6/2002 | Yoshida et al. |
| 2002/0105750 A1 | 8/2002 | Li et al. |
| 2004/0179289 A1 | 9/2004 | Suk et al. |
| 2005/0105205 A1 | 5/2005 | Suzuki |
| 2005/0152060 A1 | 7/2005 | Gururangan et al. |
| 2005/0280916 A1 | 12/2005 | Calfee et al. |
| 2006/0005403 A1 | 1/2006 | Calfee et al. |
| 2007/0091507 A1 | 4/2007 | Yong et al. |
| 2008/0013201 A1 | 1/2008 | Alexander et al. |
| 2010/0309574 A1 | 12/2010 | Bahirat et al. |

OTHER PUBLICATIONS www.microesys.com/dataStorage/specifications.html, 2007, A World of Motion Feedback Encoder Solutions.

http://www.microesys.com/pdf/pa2000.pdf, "PA 2000 High Performance Positioning System for Servotrack Writers", MicroE Systems, PA2000 Rev.S1, 2 pages.

Office Action dated Sep. 8, 2010 from U.S. Appl. No. 12/477,496, 7 pages.

Office Action dated Feb. 8, 2011 from U.S. Appl. No. 12/477,496, 9 pages.

* cited by examiner

DISK DRIVE DETECTING DISK BOUNDARIES USING MICROACTUATOR

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14, which are recorded with precise intervals and offsets relative to the track centerlines. The servo bursts 14 provide fine head position information used for centerline tracking while accessing a data track during write/read operations.

There are several prior art techniques for writing the servo sectors to the disk, including an external servo writer that writes the servo sectors by controlling the head internal to the disk drive using precise external positioning mechanics, such as a laser interferometer. Other techniques may involve self servo writing the servo sectors by servoing off of a seed pattern, or by propagating the servo sectors across the radius of the disk. In yet another technique, a media writer may simultaneously write the servo sectors to a number of disk surfaces, and then one or more of the servo written disks installed into a production disk drive. A similar technique may use a printing technique (e.g., stamping or etching technique) to servo write the disks which are then inserted into a production disk drive.

If ramp loading/unloading is used, it is desirable to locate the edge of the ramp with respect to the outer diameter of the disk as well as to locate the inner diameter (ID) crash stop in order to maximize the usable area of the disk. For example, an external servo writer or media writer that employs ramp loading/unloading may attempt to locate the edge of the ramp so that the servo sectors may be written up to the edge of the ramp, as well as locate the ID crash stop so that the servo sectors may be written up to the inner most boundary of the disk. Similarly, a seed servo writer may attempt to locate the edge of the ramp and/or the ID crash stop so that the seed tracks (e.g., spiral seed tracks) may be written up to the edge of the ramp across the disk to the inner diameter boundary defined by the ID crash stop. If a disk drive performs self servo writing of the servo sectors, again it is desirable to write the servo sectors up to the edge of the ramp to the inner diameter boundary. If the servo sectors are written (or printed) and then the servo written disk installed into a disk drive (including to install the edge of a ramp over the edge of the disk), it is desirable to locate the edge of the ramp to determine the first usable servo track as well as locate the inner diameter boundary (based on the ID crash stop) and thereby format the disk with corresponding data tracks.

Prior art techniques for locating the outer diameter and inner diameter boundaries of a disk include evaluating a back electromotive force (BEMF) voltage generated by the VCM. However, the VCM's BEMF voltage is a noisy signal that requires a margin from the detected disk boundaries, thereby reducing the overall usable area of the disk surface. In addition, the VCM BEMF voltage cannot distinguish between the actuator arms for each disk surface and therefore the VCM BEMF voltage cannot be used to identify the disk boundaries for each individual disk surface.

DETAILED DESCRIPTION OF EMBODIMENTS OF THE INVENTION

Figure 1:
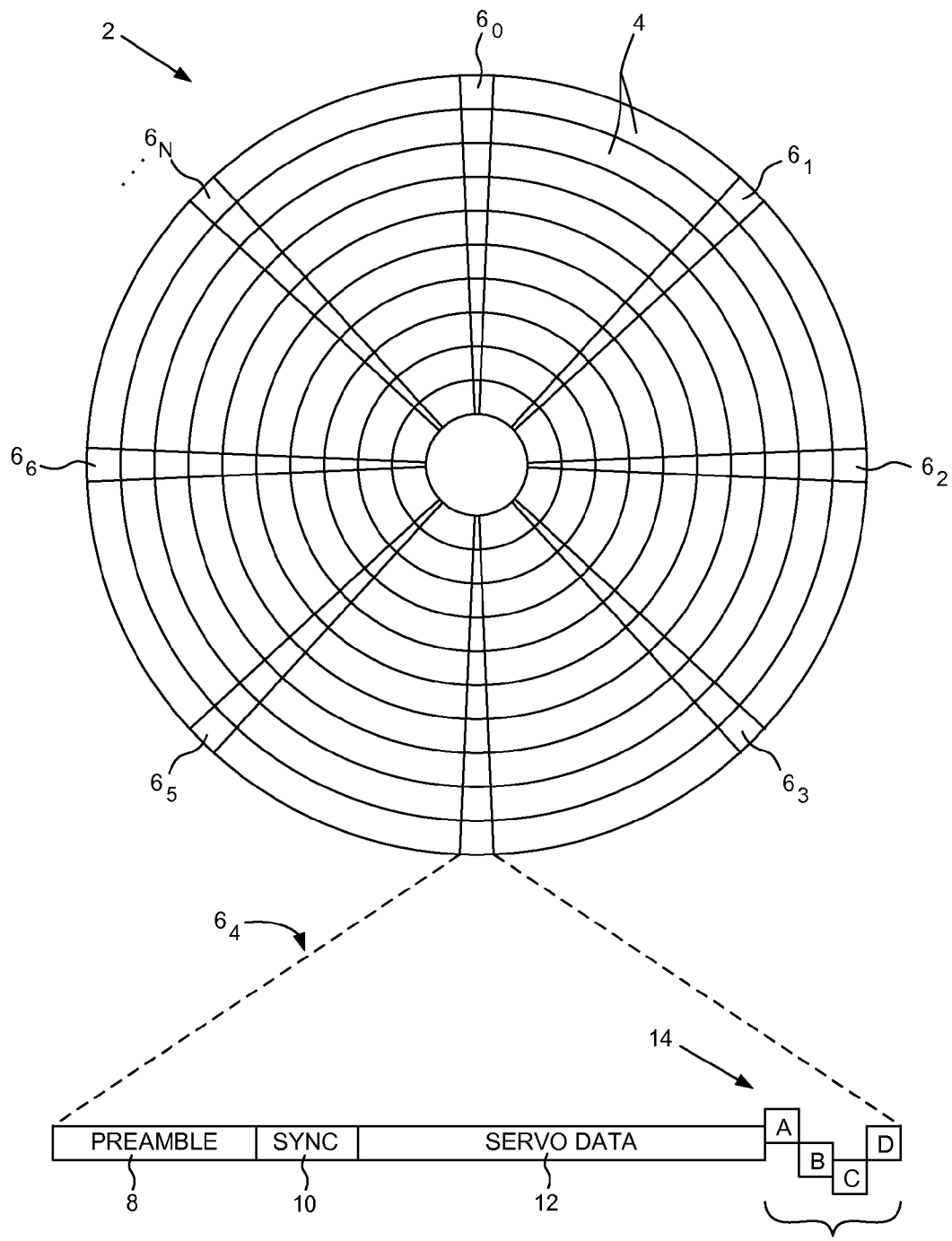
FIG. 1 shows a prior art disk format comprising servo sectors that define servo tracks.
Figure 2A:
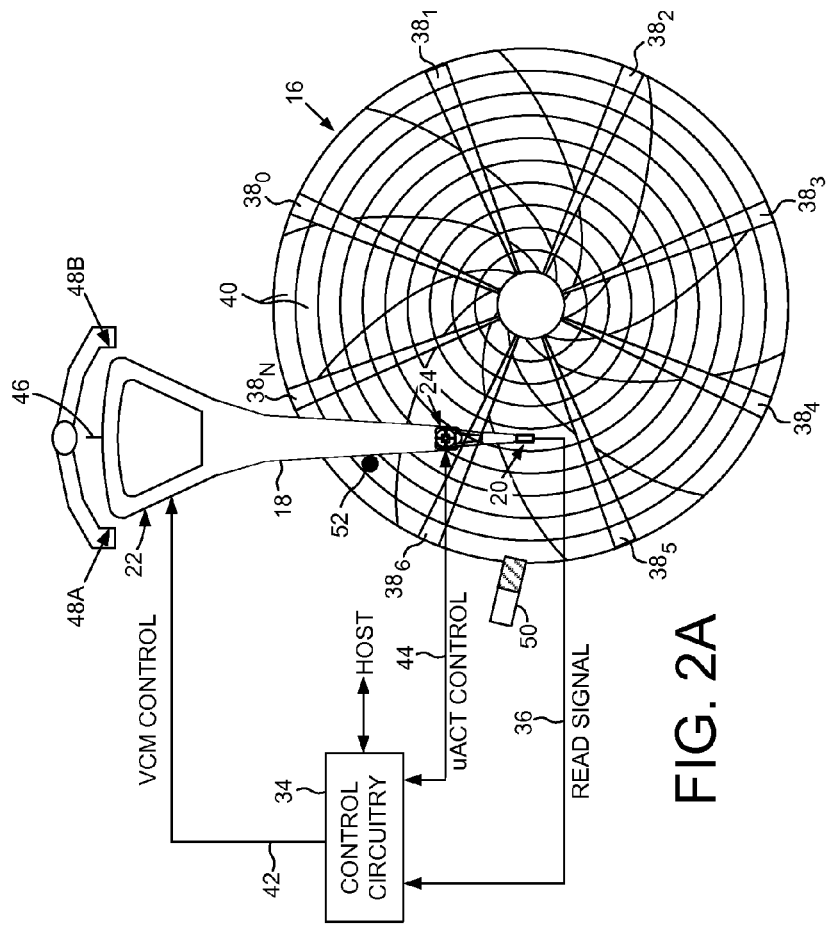
FIG. 2A shows a disk drive according to an embodiment of the present invention comprising a head coupled to the distal end of an actuator arm rotated about a pivot by a voice coil motor (VCM).
Figure 2B:
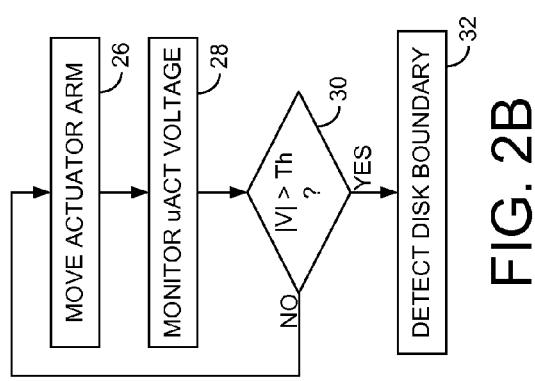
FIG. 2B is a flow diagram according to an embodiment of the present invention wherein a boundary of the disk is located by monitoring a voltage induced by a microactuator.

FIG. 2A shows a disk drive according to an embodiment of the present invention comprising a disk 16, an actuator arm 18, a head 20 coupled to a distal end of the actuator arm 18, a voice coil motor (VCM) 22 operable to actuate the head 20 over the disk in coarse movements by rotating the actuator arm 18 about a pivot, and a microactuator 24 operable to actuate the head 20 over the disk 16 in fine movements. FIG. 2B is a flow diagram according to an embodiment of the present invention for detecting a disk boundary condition by moving the actuator arm toward one of an outer diameter of the disk and an inner diameter of the disk (step 26), and monitoring an induced voltage generated by the microactuator (step 28). The disk boundary condition is detected (step 32) when the induced voltage exceeds a threshold (step 30).

In the embodiment of FIG. 2A, the disk drive comprises control circuitry 34 that processes a read signal 36 emanating from the head 20 to read servo sectors $38_0$-$38_N$ and generate a position error signal (PES) representing a position of the head 20 relative to tracks 40 defined by the servo sectors $38_0$-$38_N$. The control circuitry 34 comprises a suitable servo compensator which filters the PES to generate a control signal 42 applied to the VCM 22 as well as a control signal 44 applied to the microactuator 24. The VCM 22 rotates the actuator arm 18 about a pivot in order to move the head 20 radially over the disk in coarse movements, and the microactuator moves the head 20 radially over the disk in fine movements in a direction that reduces the PES.

Any suitable microactuator may be employed in the embodiments of the present invention, such as one or more piezoelectric actuators having a shape that deforms in response to an applied electrical signal (e.g., an applied voltage). In the embodiment of FIG. 2A, the microactuator couples a suspension to the actuator arm in order to rotate the suspension about a pivot to servo the head over fine movements. However, the microactuator may be located at any suitable location on the actuator arm, such as a microactuator which couples a gimbal to the suspension, wherein the head is mounted to the gimbal.

In the embodiment of FIG. 2A, the VCM 22 comprises a voice coil that generates a magnetic field when excited with current that interacts with a magnetic field of permanent magnets (not shown) to generate a rotation torque for rotating the actuator arm 18 about the pivot. In order to limit the radial movement of the head 20, a tang 46 coupled to a base of the actuator arm 18 engages an inner diameter (ID) crash stop 48A and an outer diameter (OD) crash stop 48B. Also in the embodiment of FIG. 2A, the actuator arm 18 is parked on a ramp 50 located near an outer edge of the disk 16 when the disk drive is idle. Accordingly, in one embodiment the radial location of the head 20 when the actuator arm 18 contacts the ID crash stop 48A defines a first disk boundary, and the radial location of the head 20 when the actuator arm 18 contacts the edge of the ramp 50 defines a second disk boundary. As described in greater detail below, the voltage induced by the microactuator is used to detect the disk boundaries, for example, prior to writing seed tracks to the disk (e.g., spiral seed tracks), prior to writing product servo sectors to the disk, prior to formatting the disk, etc.

The disk boundaries may be detected using the voltage induced by the microactuator in any suitable application. In one embodiment, an external servo writer may be used to write the servo sectors $38_0$-$38_N$ to the disk, or to write seed tracks to the disk (e.g., spiral seed tracks). The external servo writer presses a positioning pin 52 (FIG. 2A) against the actuator arm 18 in order to move the actuator arm 18 toward the inner or outer diameter of the disk, wherein in one embodiment the VCM 22 applies a biasing force against the positioning pin 52. The positioning pin 52 is inserted through an aperture of a head disk assembly (HDA) that houses the disk 16, actuator arm 18, VCM 22, crash stops 48A and 48B, and ramp 50. Prior to writing servo data on the disk 16, the external servo writer executes the flow diagram of FIG. 2B in order to detect the disk boundaries so that the servo data may be written over substantially the entire usable area of the disk 16. In another embodiment, a media writer is used to write the servo data (servo sectors or seed tracks) to a plurality of disks, wherein one or more of the disk is then inserted into an HDA of a production disk drive. Similar to a production disk drive, the external servo writer and media writer may employ an inner diameter crash stop and a ramp that define the disk boundaries, wherein the external servo writer or media writer may execute the flow diagram of FIG. 2B to detect the disk boundaries prior to writing the servo data to the disks.

In yet another embodiment, the control circuitry 34 internal to a production disk drive may execute the flow diagram of FIG. 2B to detect the disk boundaries, wherein in this embodiment the control circuitry 34 controls the VCM 22 to move the actuator arm 18 toward the inner and/or outer diameter of the disk 16. In one embodiment, the control circuitry 34 may detect the disk boundaries prior to writing the product servo sectors $38_0$-$38_N$ to the disk 16 (e.g., by propagating the servo sectors or by servoing off of seed tracks). In another embodiment, the control circuitry 34 may detect the disk boundaries in order to format the disk (i.e., by determining the maximum number of servo tracks recorded on the disk relative to the disk boundaries).

In one embodiment, when detecting the inner diameter disk boundary, the actuator arm 18 is moved toward the ID crash stop 48A, and when the tang 46 contacts the ID crash stop 48A, the resulting vibration of the actuator arm 18 induces a movement in the microactuator 24 which generates a corresponding induced voltage. When detecting the outer diameter disk boundary, the actuator arm 18 is moved toward the ramp 50, and when the actuator arm 18 contacts the ramp 50, it induces a movement in the microactuator 24 (directly or through a vibration) which generates a corresponding induced voltage.

Figure 2C:
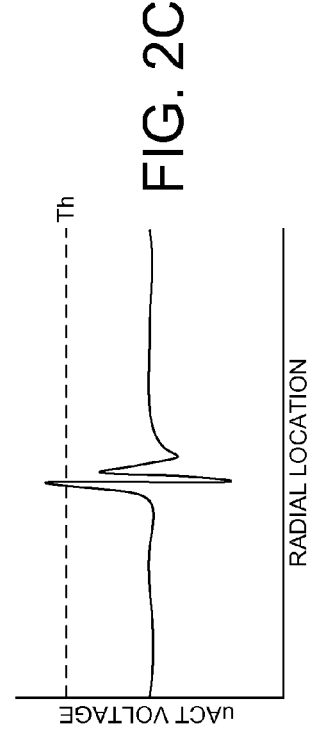
FIG. 2C shows an example induced voltage that exceeds a threshold when the actuator arm reaches a disk boundary according to an embodiment of the present invention.
Figure 3A:
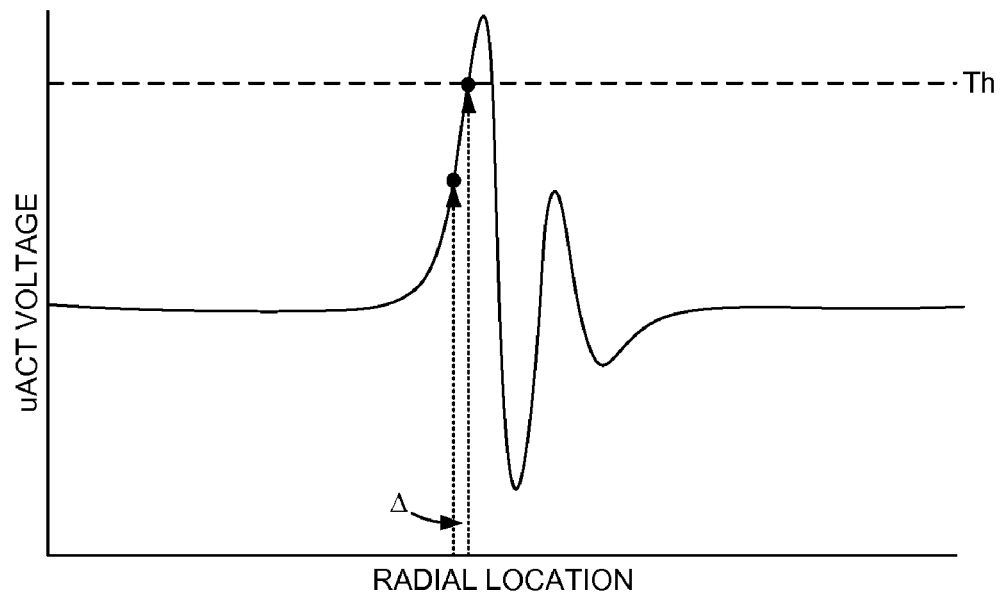
FIG. 3A shows an embodiment of the present invention wherein a boundary of the disk is established by subtracting a delta from the radial location where the induced voltage exceeds a threshold.
Figure 3B:
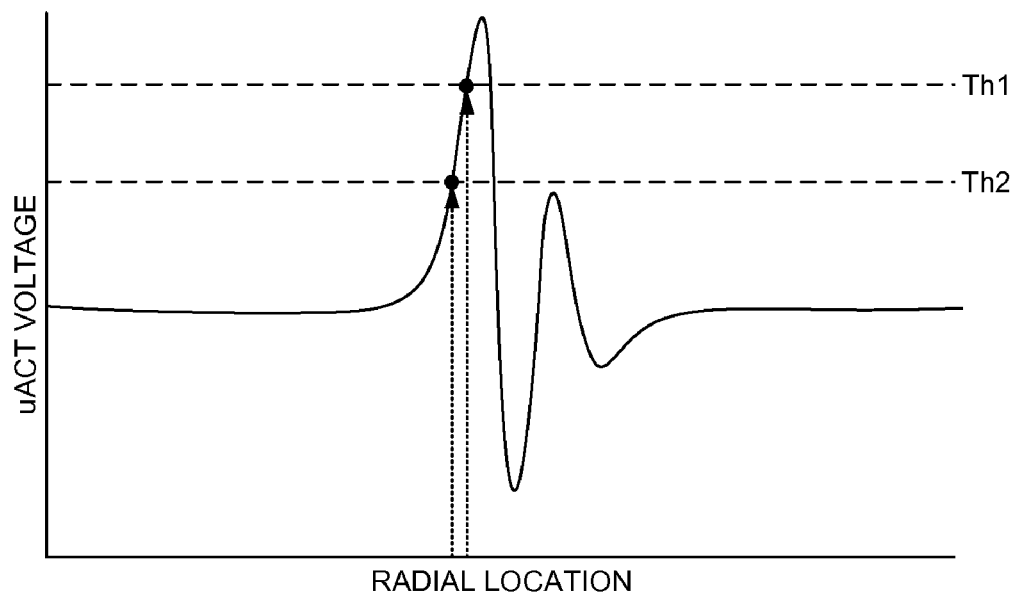
FIG. 3B shows an embodiment of the present invention wherein a boundary of the disk is established relative to a second (lower) threshold.

FIG. 2C illustrates an embodiment of the present invention wherein the induced voltage generated by the microactuator is compared to a positive threshold. In another embodiment, the induced voltage may be compared to positive and negative thresholds (or an absolute magnitude compared to a threshold as shown in step 30 of FIG. 2B). In one embodiment, the disk boundary condition is detected relative to an offset from a radial location of the actuator arm when the induced voltage exceeds the threshold. For example, in an embodiment illustrated in FIG. 3A, the disk boundary condition may be detected as the radial location offset by a delta from the radial location where the induced voltage exceeds the threshold. In another embodiment shown in FIG. 3B, the disk boundary condition is detected as the radial location where the induced voltage exceeds a second threshold lower than a first threshold (after the induced voltage exceeds the first threshold). Detecting the disk boundary condition relative to an offset may help compensate for a margin of error in detecting the disk boundary condition.

Figure 4A:
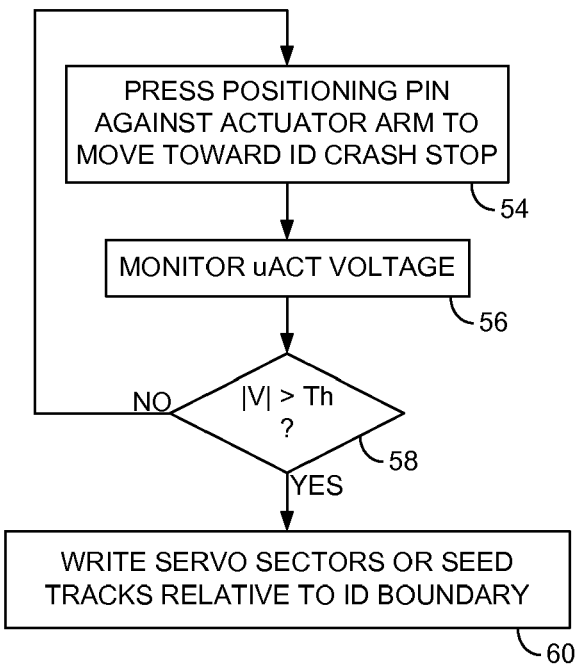
FIG. 4A is a flow diagram according to an embodiment of the present invention wherein a positioning pin is pressed against the actuator arm in order to move the actuator arm toward an inner diameter (ID) crash stop.

FIG. 4A is a flow diagram according to an embodiment of the present invention wherein a positioning pin is pressed against the actuator arm to move the actuator arm toward the ID crash stop (step 54). The voltage induced by the microactuator is monitored (step 56), and when the induced voltage exceeds a threshold (step 58), an ID boundary is detected for use in writing servo sectors or seed tracks to the disk (step 60).

Figure 4B:
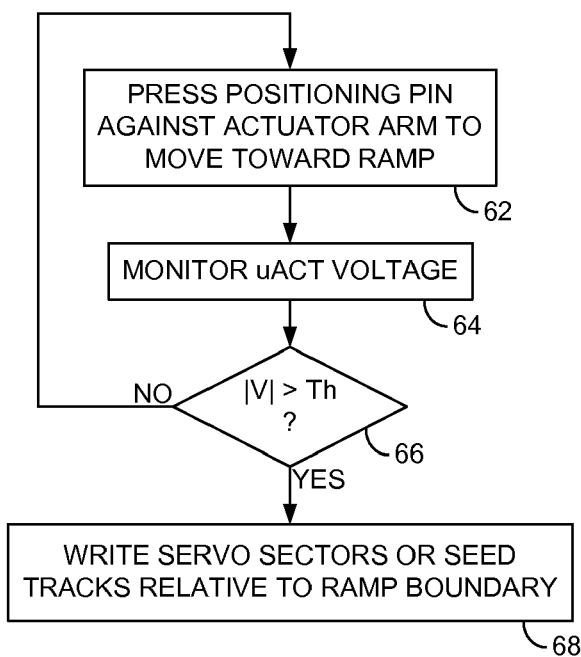
FIG. 4B is a flow diagram according to an embodiment of the present invention wherein a positioning pin is pressed against the actuator arm in order to move the actuator arm toward a ramp.

FIG. 4B is a flow diagram according to an embodiment of the present invention wherein a positioning pin is pressed against the actuator arm to move the actuator arm toward the ramp (step 62). The voltage induced by the microactuator is monitored (step 64), and when the induced voltage exceeds a threshold (step 66), an OD boundary is detected for use in writing servo sectors or seed tracks to the disk (step 68). The flow diagrams of FIGS. 4A and 4B may be executed by an external servo writer or by a media writer. In one embodiment, the external servo writer and/or media writer may use the microactuator in order to perform servo writing after detecting the disk boundaries.

Figure 5A:
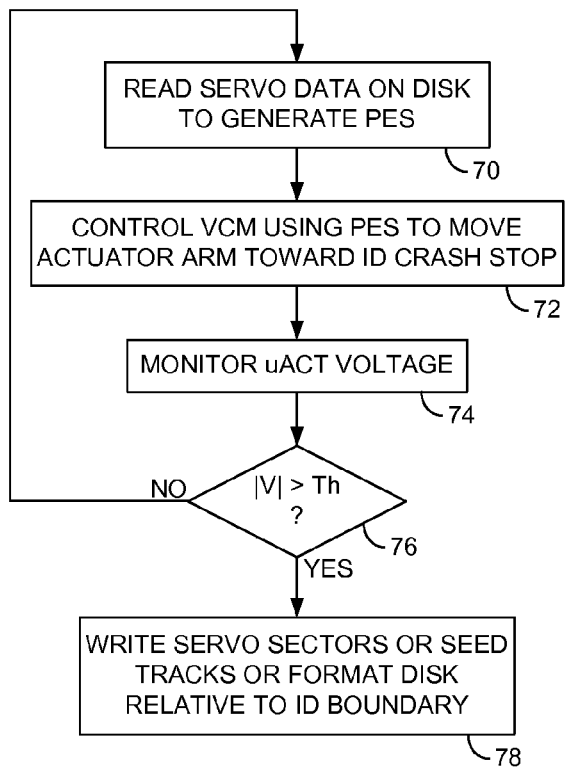
FIG. 5A is a flow diagram according to an embodiment of the present invention wherein the VCM is used to move the actuator arm toward the ID crash stop in response to servo data recorded on the disk.

FIG. 5A is a flow diagram according to an embodiment of the present invention wherein servo data is read from the disk to generate a PES (step 70) for controlling the VCM in order to move the actuator arm toward the ID crash stop (step 72). The PES may be generated in any suitable manner depending on the type of servo data read from the disk. In one embodiment, the servo data read from the disk comprises the product servo sectors (e.g., when formatting a disk surface or propagating seed tracks to other disk surfaces), and therefore the PES is generated using any well known technique for demodulating the product servo sectors. In another embodiment, the servo data read from the disk comprises seed data (e.g., seed tracks) used to servo write the product servo sectors to the disk, and therefore the PES is generated using any well known technique for demodulating the seed data. The voltage induced by the microactuator is monitored (step 74), and when the induced voltage exceeds a threshold (step 76), an ID boundary is detected for use in writing servo sectors or seed tracks to the disk and/or to format the disk (step 78).

Figure 5B:
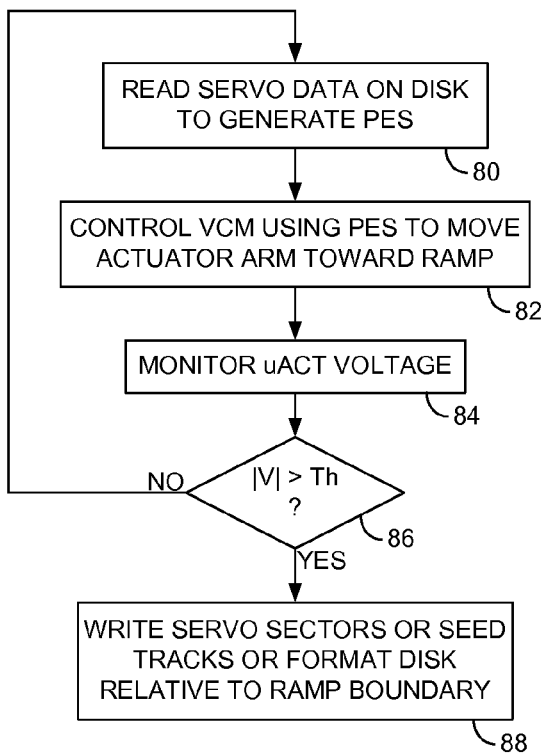
FIG. 5B is a flow diagram according to an embodiment of the present invention wherein the VCM is used to move the actuator arm toward the ramp in response to servo data recorded on the disk.

FIG. 5B is a flow diagram according to an embodiment of the present invention wherein servo data is read from the disk to generate a PES (step 80) for controlling the VCM in order to move the actuator arm toward the ramp (step 82). The voltage induced by the microactuator is monitored (step 84), and when the induced voltage exceeds a threshold (step 86), an OD boundary is detected for use in writing servo sectors or seed tracks to the disk and/or to format the disk (step 88). The flow diagrams of FIGS. 5A and 5B may be executed by the control circuitry internal to each production disk drive. In one embodiment, the control circuitry may use the microactuator in order to perform servo writing after detecting the disk boundaries.

Figure 6A:
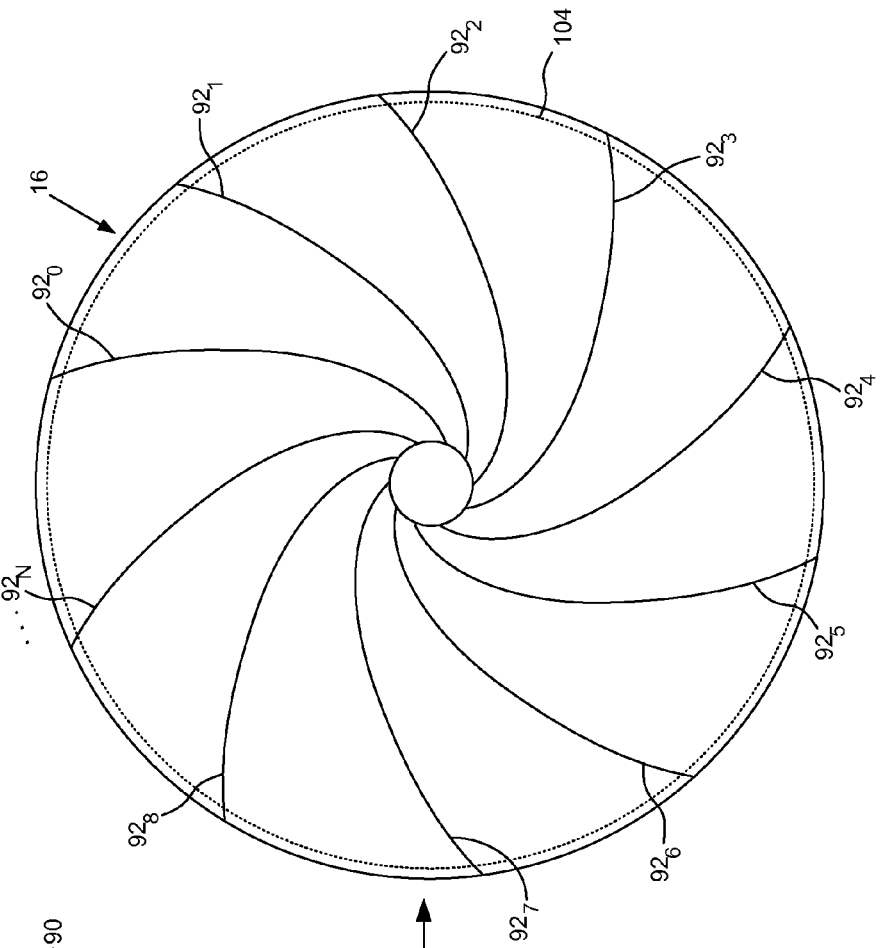
FIGS. 6A and 6B show an embodiment of the present invention wherein an external spiral servo writer is used to write spiral seed tracks to the disk for use in writing product servo sectors to the disk.
Figure 6B:
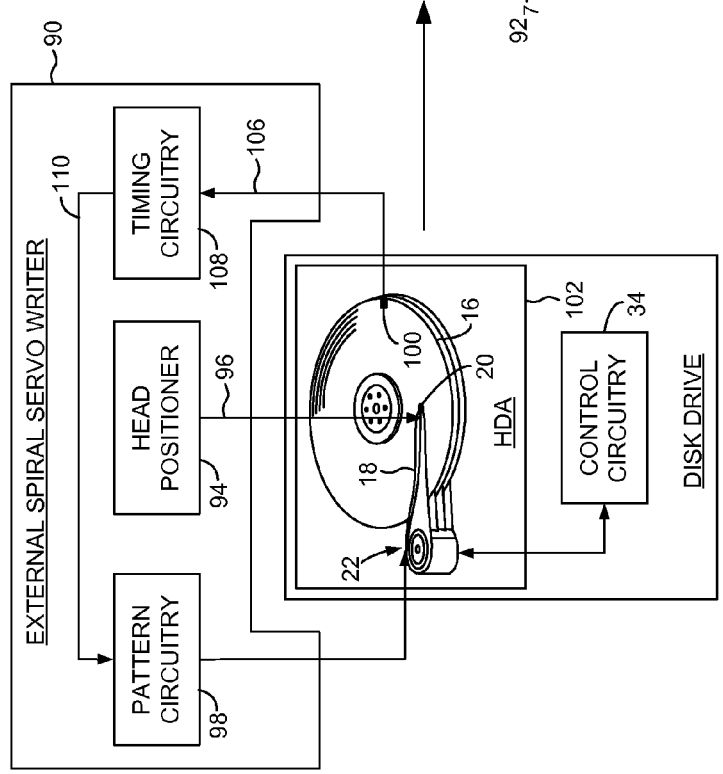

FIGS. 6A and 6B show an embodiment of the present invention wherein an external spiral servo writer 90 writes a plurality of spiral seed tracks $92_0$-$92_N$ to the disk 16 which are then used to write product servo sectors $38_0$-$38_N$ to the disk (using a fill station or the control circuitry internal to each production disk drive). The external spiral servo writer 90 comprises a head positioner 94 for actuating a head positioning pin 96 using sensitive positioning circuitry, such as a laser interferometer. Pattern circuitry 98 generates the data sequence written to the disk 16 for the spiral tracks $38_0$-$38_N$. The external spiral servo writer 90 inserts a clock head 100 into the HDA 102 for writing a clock track 104 (FIG. 6B) at an outer diameter of the disk 16. The clock head 100 then reads the clock track 104 to generate a clock signal 106 processed by timing recovery circuitry 108 to synchronize a write clock 110 for writing the spiral tracks $92_0$-$92_N$ to the disk 16. The timing recovery circuitry 108 enables the pattern circuitry 98 at the appropriate time relative to the write clock 110 so that the spiral tracks $92_0$-$92_N$ are written at the appropriate circular location. The timing recovery circuitry 108 also enables the pattern circuitry 98 relative to the write clock 110 to write sync marks within the spiral tracks $92_0$-$92_N$ at the same circular location from the outer diameter to the inner diameter of the disk 16. The constant interval between sync marks (independent of the radial location of the head 20) enables a servo write clock to maintain synchronization while writing the product servo sectors to the disk.

Figure 7:
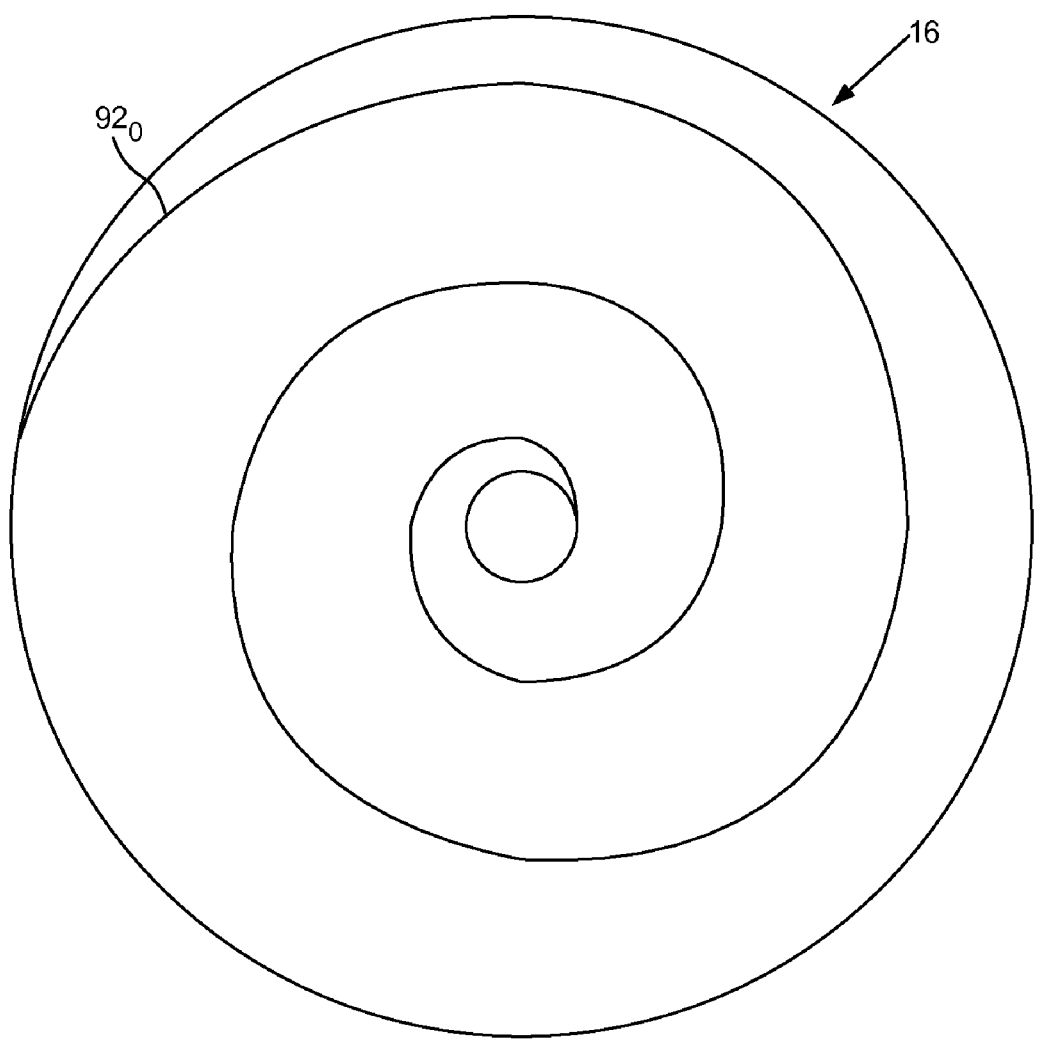
FIG. 7 shows an embodiment of the present invention wherein each spiral seed track is written over multiple disk revolutions.

In the embodiment of FIG. 6B, each spiral track $92_i$ is written over a partial revolution of the disk 16. In an alternative embodiment, each spiral track $92_i$ is written over one or more revolutions of the disk 16. FIG. 7 shows an embodiment wherein each spiral track $92_i$ is written over multiple revolutions of the disk 16. In the embodiment of FIG. 6A, the entire disk drive is shown as being inserted into the external spiral servo writer 90. In an alternative embodiment, only the HDA 102 is inserted into the external spiral servo writer 90. In yet another embodiment, a media writer is used to write the spiral tracks $92_0$-$92_N$ to a number of disks 16, and one or more of the disks 16 are then inserted into an HDA 102. As described above, the external spiral servo writer 90 (or media writer) detects the disk boundaries prior to writing the spiral seed tracks $92_0$-$92_N$ so they can be written over substantially the entire usable area of the disk 16.

Figure 8A:
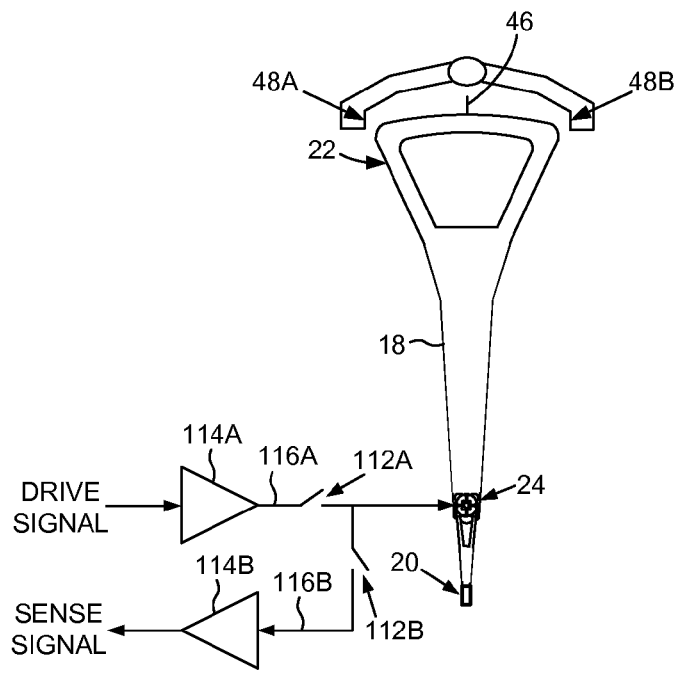
FIG. 8A shows an embodiment of the present invention wherein a microactuator controller is configured into one of a driving mode and a detecting mode.

FIG. 8A shows an embodiment of the present invention wherein a microactuator controller is configured into one of a driving mode and a detecting mode. When in the driving mode, switch 112A is closed and switch 112B is opened so that driving amplifier 114A applies a driving signal 116A to the microactuator 24. When in the detecting mode, switch 112A is opened and switch 112B is closed so that a voltage signal 116B generated by the microactuator 24 is input into a sense amplifier 114B. In one embodiment, the driving amplifier 114A, sense amplifier 114B, and switches 112A and 112B are fabricated in an integrated circuit having a single input/output pin coupled to the microactuator 24.

Figure 8B:
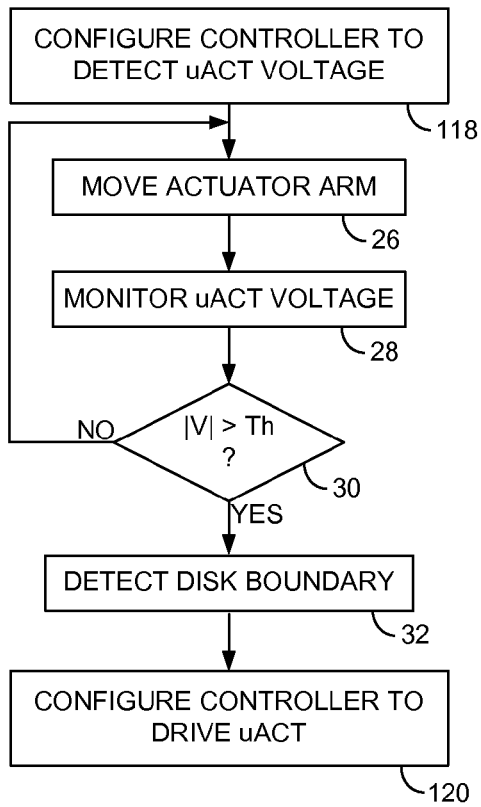
FIG. 8B is a flow diagram according to an embodiment of the present invention wherein prior to moving the actuator arm during the disk boundary calibration, the microactuator controller is configured into the detecting mode.

FIG. 8B is a flow diagram according to an embodiment of the present invention wherein prior to executing the flow diagram of FIG. 2B, the microactuator controller of FIG. 8A is configured into the detecting mode (step 118) so that the voltage induced by the microactuator can be monitored to detect at least one of the disk boundaries. After detecting at least one of the disk boundaries, the microactuator controller of FIG. 8A is configured into the driving mode (step 120) so that the microactuator can be used to servo the head over the disk (e.g., while writing the product servo sectors to the disk).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A method of detecting a disk boundary condition for a disk drive, the disk drive comprising a head actuated over the disk in coarse movements by a voice coil motor (VCM) rotating an actuator arm about a pivot, and a microactuator for actuating the head over the disk in fine movements, the method comprising:
   moving the actuator arm toward one of an outer diameter of the disk and an inner diameter of the disk;
   monitoring an induced voltage generated by the microactuator; and
   detecting the disk boundary condition when the induced voltage exceeds a threshold.

2. The method as recited in claim 1, wherein the disk boundary condition corresponds to the actuator arm contacting an inner diameter crash stop.

3. The method as recited in claim 1, wherein the disk boundary condition corresponds to the actuator arm contacting an edge of a ramp located near an outer edge of the disk.

4. The method as recited in claim 1, wherein the disk boundary condition is detected relative to an offset from a radial location of the actuator arm when the induced voltage exceeds the threshold.

5. The method as recited in claim 1, wherein moving the actuator arm comprises pressing a positioning pin against the actuator arm.

6. The method as recited in claim 1, wherein moving the actuator arm comprises controlling the VCM to rotate the actuator arm about the pivot.

7. The method as recited in claim 6, wherein moving the actuator arm comprises controlling the VCM in response to servo data recorded on the disk.

8. The method as recited in claim 7, wherein the servo data comprises product servo sectors.

9. The method as recited in claim 7, wherein the servo data comprises seed tracks used to write product servo sectors to the disk.

10. The method as recited in claim 9, wherein the seed tracks comprise concentric tracks recorded at an outer diameter of the disk.

11. The method as recited in claim 9, wherein the seed tracks comprise spiral tracks.

12. The method as recited in claim 1, wherein prior to moving the actuator arm, further comprising configuring control circuitry operable to drive the microactuator into control circuitry operable to detect the induced voltage generated by the microactuator.

13. A disk drive comprising:
   a disk;
   an actuator arm;
   a head coupled to a distal end of the actuator arm;
   a voice coil motor (VCM) operable to actuate the head over the disk in coarse movements by rotating the actuator arm about a pivot;
   a microactuator operable to actuate the head over the disk in fine movements; and
   control circuitry operable to:
      move the actuator arm toward one of an outer diameter of the disk and an inner diameter of the disk;
      monitor an induced voltage generated by the microactuator; and
      detect a disk boundary condition when the induced voltage exceeds a threshold.

14. The disk drive as recited in claim 13, wherein the disk boundary condition corresponds to the actuator arm contacting an inner diameter crash stop.

15. The disk drive as recited in claim 13, wherein the disk boundary condition corresponds to the actuator arm contacting an edge of a ramp located near an outer edge of the disk.

16. The disk drive as recited in claim 13, wherein the disk boundary condition is detected relative to an offset from a radial location of the actuator arm when the induced voltage exceeds the threshold.

17. The disk drive as recited in claim 13, wherein moving the actuator arm comprises pressing a positioning pin against the actuator arm.

18. The disk drive as recited in claim 13, wherein moving the actuator arm comprises controlling the VCM to rotate the actuator arm about the pivot.

19. The disk drive as recited in claim 18, wherein moving the actuator arm comprises controlling the VCM in response to servo data recorded on the disk.

20. The disk drive as recited in claim 19, wherein the servo data comprises product servo sectors.

21. The disk drive as recited in claim 19, wherein the servo data comprises seed tracks used to write product servo sectors to the disk.

22. The disk drive as recited in claim 21, wherein the seed tracks comprise concentric tracks recorded at an outer diameter of the disk.

23. The disk drive as recited in claim 21, wherein the seed tracks comprise spiral tracks.

24. The disk drive as recited in claim 13, wherein prior to moving the actuator arm, the control circuitry is further operable to configuring a microactuator controller from a driving mode into a detecting mode to detect the induced voltage generated by the microactuator.

* * * * *